(12) United States Patent
Ko et al.

(10) Patent No.: US 10,579,458 B2
(45) Date of Patent: Mar. 3, 2020

(54) DATA LOGGER

(71) Applicant: SANDISK TECHNOLOGIES LLC, Plano, TX (US)

(72) Inventors: Jae-In Ko, Seongnam (KR); Insoo Yoon, San Jose, CA (US); Jung Oh Kweon, Incheon-si (KR); Sun Mi Hwang, Seoul (KR)

(73) Assignee: SANDISK TECHNOLOGIES LLC, Plano, TX (US)

( * ) Notice: Subject to any disclaimer, the term of this patent is extended or adjusted under 35 U.S.C. 154(b) by 155 days.

(21) Appl. No.: 15/173,127

(22) Filed: Jun. 3, 2016

(65) Prior Publication Data

US 2017/0139765 A1 May 18, 2017

Related U.S. Application Data

(60) Provisional application No. 62/255,099, filed on Nov. 13, 2015.

(51) Int. Cl.
*G06F 11/00* (2006.01)
*G06F 11/07* (2006.01)
*G06F 13/00* (2006.01)

(52) U.S. Cl.
CPC ...... *G06F 11/0778* (2013.01); *G06F 11/0727* (2013.01); *G06F 11/0748* (2013.01); *G06F 11/0772* (2013.01); *G06F 13/00* (2013.01)

(58) Field of Classification Search
CPC ............. G06F 11/0778; G06F 11/3476; G06F 11/0784; G06F 11/0766
See application file for complete search history.

(56) References Cited

U.S. PATENT DOCUMENTS

| | | | |
|---|---|---|---|
| 3,999,051 A | 12/1976 | Petschauer | |
| 4,914,686 A | 4/1990 | Hagar, III et al. | |
| 7,218,094 B2 | 5/2007 | Khandros et al. | |
| 7,424,653 B2 | 9/2008 | Adkisson et al. | |
| 7,821,255 B2 | 10/2010 | Khandros et al. | |
| 8,327,193 B2 | 12/2012 | Enarson et al. | |
| 8,510,133 B2* | 8/2013 | Peak | G06Q 40/08 705/4 |
| 2005/0162312 A1 | 7/2005 | Riday | |
| 2005/0225347 A1 | 10/2005 | Khandros et al. | |
| 2006/0184295 A1* | 8/2006 | Hawkins | G07C 5/008 701/31.4 |
| 2007/0143851 A1* | 6/2007 | Nicodemus | G06F 21/55 726/25 |
| 2007/0268128 A1 | 11/2007 | Swanson et al. | |
| 2008/0120440 A1* | 5/2008 | Balasubramanian | G06F 11/328 710/19 |
| 2008/0177926 A1* | 7/2008 | Minami | G06F 11/0748 710/316 |
| 2009/0327588 A1 | 12/2009 | Sutardja et al. | |
| 2012/0136802 A1* | 5/2012 | McQuade | G06Q 30/0282 705/347 |

(Continued)

*Primary Examiner* — Christopher S McCarthy
(74) *Attorney, Agent, or Firm* — Vierra Magen Marcus LLP

(57) ABSTRACT

A device includes a connector configured to be coupled to a storage device. The device also includes a controller coupled to the connector and powered via the connector. The controller is configured to receive log data from the storage device while powered via the connector. The controller is also configured to transmit the log data via a wireless interface to a remote device.

23 Claims, 3 Drawing Sheets

(56) References Cited

U.S. PATENT DOCUMENTS

| | | | |
|---|---|---|---|
| 2012/0191242 A1* | 7/2012 | Outwater | G06Q 30/06 700/236 |
| 2012/0290246 A1 | 11/2012 | Bhatnagar et al. | |
| 2013/0132657 A1* | 5/2013 | Kozlovsky | G06F 12/0246 711/103 |
| 2013/0226397 A1* | 8/2013 | Kuphal | G06Q 10/08 701/33.2 |
| 2013/0254833 A1* | 9/2013 | Nicodemus | G06F 21/55 726/1 |
| 2014/0298041 A1* | 10/2014 | Consalus | G06F 21/602 713/193 |
| 2015/0006979 A1 | 1/2015 | Tran et al. | |
| 2015/0178236 A1* | 6/2015 | Sharma | G06F 13/385 710/38 |
| 2015/0212512 A1 | 7/2015 | Butler | |
| 2015/0244806 A1* | 8/2015 | Renac | G06F 13/385 709/203 |
| 2015/0253988 A1* | 9/2015 | Ong | G06F 3/061 711/103 |
| 2015/0281361 A1* | 10/2015 | Maeda | G06F 17/30067 709/219 |
| 2016/0009337 A1* | 1/2016 | Biderman | B60L 15/20 701/2 |
| 2016/0140776 A1* | 5/2016 | Ricci | G06F 9/54 701/31.4 |
| 2016/0162375 A1* | 6/2016 | Kim | G06F 3/0619 714/6.13 |
| 2016/0196745 A1* | 7/2016 | Ricci | H04W 4/046 340/905 |
| 2016/0247377 A1* | 8/2016 | Ricci | B60Q 1/00 |
| 2017/0018253 A1* | 1/2017 | Castaneda | G06F 1/1654 |
| 2017/0193715 A1* | 7/2017 | Green | G07C 5/0825 |
| 2017/0206496 A1* | 7/2017 | McQuade | G06Q 10/0832 |
| 2017/0223628 A1* | 8/2017 | Snyder | H04W 48/20 |
| 2017/0232888 A1* | 8/2017 | Ricci | B60Q 9/00 705/27.1 |

* cited by examiner

DATA LOGGER

CROSS-REFERENCE TO RELATED APPLICATIONS

The present application claims benefit of U.S. Provisional Application No. 62/255,099, filed Nov. 13, 2015, which is incorporated by reference herein in its entirety.

FIELD OF THE DISCLOSURE

This disclosure is generally related to a data logger.

BACKGROUND

Non-volatile storage devices, such as flash memory devices, have enabled increased portability of data and software applications. For example, flash memory devices can enhance data storage density by storing multiple bits in each cell of the flash memory. To illustrate, Multi-Level Cell (MLC) flash memory devices provide increased storage density by storing 3 bits per cell, 4 bits per cell, or more. Electronic devices, such as mobile phones, tables, or laptop computers, typically use non-volatile storage devices, such as flash memory devices, for persistent storage of information, such as data and program code that is used by the electronic device. Advances in technology have resulted in increased storage capacities of non-volatile storage devices with reductions in storage device size and cost.

For example, the non-volatile storage device, such as a solid state drive (SSD), may be embedded into the device. During operation of the SSD, the SSD may generate one or more data logs that represent an operational status of the SSD. The one or more data logs may include information such as an error message or a drive status of the SSD. In the event of a problem with the SSD, a host device may access (e.g., retrieve) the one or more data logs from the SSD and may perform a failure analysis using the one or more data logs. Typically, a wired connection between the host device and a dedicated port (e.g., a test port) of the SSD is needed to be able to receive and/or retrieve the one or more data logs from the SSD. However, when the SSD is embedded in a device, connecting the host device to the SSD may be a time consuming and laborious process.

DETAILED DESCRIPTION

Figure 1:
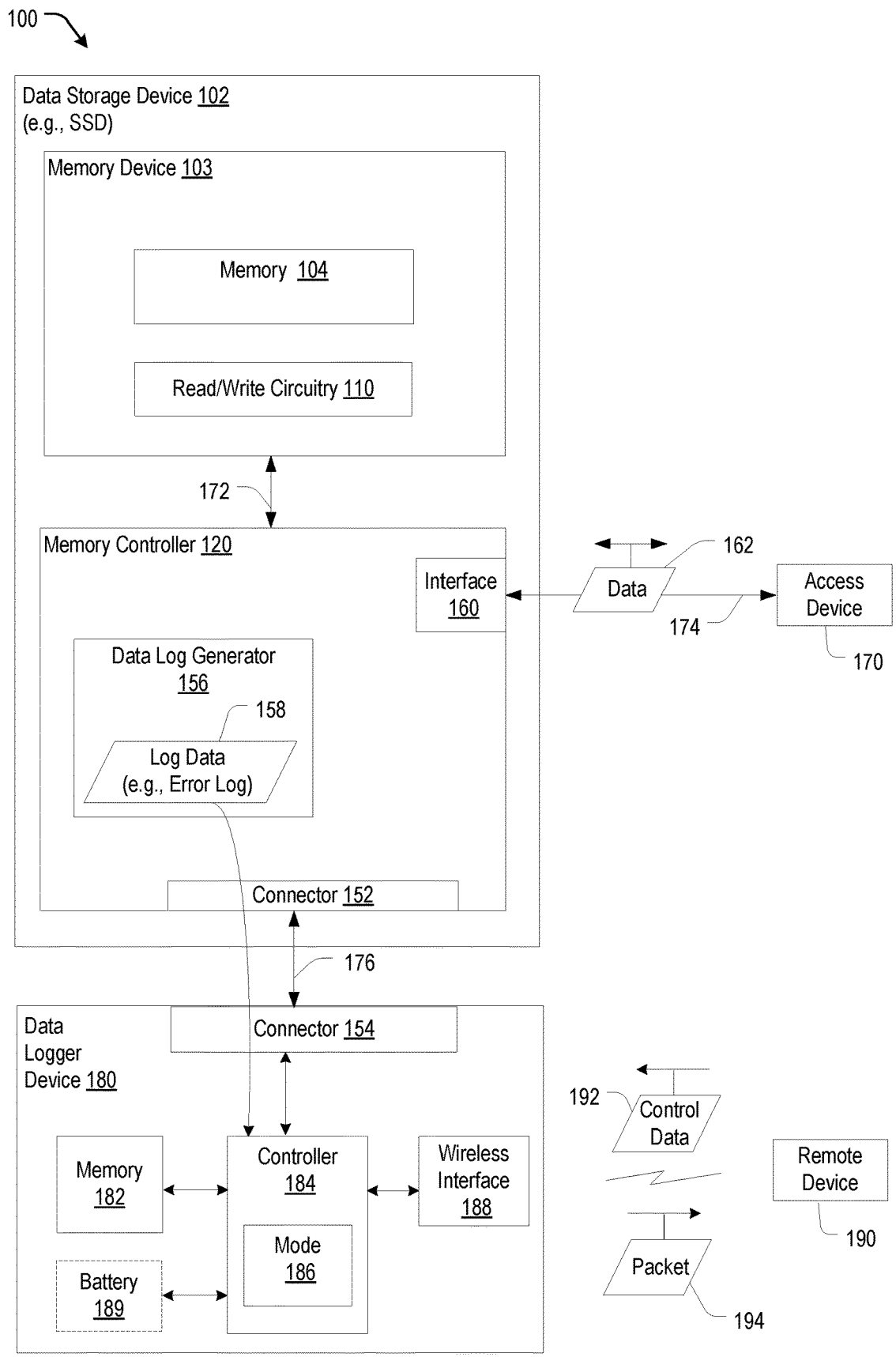
FIG. 1 is a block diagram of a particular illustrative example of a system including a data logger device configured to receive log data generated by the a data storage device and to transmit the log data to a remote device.

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "examplary" may indicate an example, an implementation, and/or an aspect, and should not be construed as limiting or as indicating a preference or a preferred example, implementation, and/or aspect.

The present disclosure describes systems and methods of using a data logger device to collect log data of a storage device, such as a solid state drive (SSD). The log data may include status data or error data (e.g., an error message) generated by the storage device. The data logger device may be configured to be coupled to or embedded in the storage device via a connector of the data logger device. The data logger device may also be configured to transmit the log data via wireless communication to a remote device. In some implementations, the data logger device may store the log data in a memory of the data logger device. Additionally or alternatively, the data logger device may be configured to be powered from an external device (e.g., the storage device) or by a battery included in the data logger device.

In some implementations, the data logger device may be controlled by the remote device (e.g., a host device). For example, the data logger device may receive control data from the remote device. To illustrate, the control data may indicate an operating mode of multiple operating modes of the data logger device. In a first operating mode, the data logger device may receive the log data from the storage device and store the log data at the memory of the data logger device. In a second operating mode, the data logger device may transmit the log data from the memory of the data logger device to the remote device. In a third operating mode, the data logger device may receive the log data from the storage device and transmit the log data to the remote device in real-time or near real-time. In some implementations of the third operating mode, the data logger device may also store a copy of the log data at the memory of the data logger device.

The data logger device may be coupled to the storage device via the connector of the data logger device to obtain log data of the storage device. The log data may be used by the remote device to determine performance of or debug a problem (e.g., a failure) associated with the storage device. For example, performance of a storage device may be validated (e.g., tested) by a manufacturer or a consumer of the storage device prior to approving distribution or qualifying use of the storage device. A manufacturer of the storage device may provide the storage device to a consumer for validation prior to the consumer purchasing a number of storage devices. To validate the storage device, the storage device that is coupled to the data logger device may be embedded into a testing device (e.g., an access device), such as a laptop computer, that is configured to rigorously test operation of the data storage device.

The host device (e.g., a remote device) may be configured to wirelessly control the data logger device to receive log data generated by the storage device and/or to wirelessly transmit the log data to the host device. The host device may process the log data to validate (e.g., qualify) the storage device for use. In the event that a failure occurs during validation of the storage device, the host device may perform failure analysis on the log data to determine a cause of the failure. Thus, the data logger device enables the host device to receive the log data wirelessly without having to remove the storage device from the testing device and without having to couple the host device to the storage device via a wired connection. In an implementation where multiple storage devices are each included in a corresponding testing device, each storage device may be coupled to (or include) a corresponding data logger device during testing. The host device may access multiple data logger devices and may quickly acquire log data from multiple storage devices without having to be physically coupled to a single storage device. Accordingly, the data logger device may reduce physical effort, reduce costs, and shorten an amount of time to validate and/or qualify the storage device.

FIG. 1 depicts an illustrative example of a system 100 that includes a data storage device 102, an access device 170, a data logger device 180, and a remote device 190. The data storage device 102 may be coupled to the access device 170. The data storage device 102, such as a solid state drive (SSD), includes a controller 120 (e.g., a memory controller) and a memory device 103 that is coupled to the controller 120. The controller 120 is configured to generate log data 158 during operation of the data storage device 102, as described further herein. The data logger device 180 may be coupled to the data storage device 102 and may be configured to receive the log data 158 from the data storage device 102. In some implementations, the data logger device 180 may be included in (e.g., embedded within) the data storage device 102. The data logger device 180 may transmit the log data 158 to the remote device 190.

The access device 170 may include a processor and a memory (not shown). The memory of the access device 170 may include instructions that are executable by the processor to cause the access device 170 to test the data storage device 102. For example, the access device 170 may test the data storage device 102 to validate (or qualify) the data storage device 102 for use.

The access device 170 is coupled to the data storage device 102 via a connection (e.g., a first communication path 174), such as a bus or a wireless connection. The access device 170 may include a memory interface (not shown) and may be configured to communicate with the data storage device 102 via the memory interface to read data from and write data to the data storage device 102. For example, the access device 170 may communicate with the data storage device 102 in accordance with a communication protocol.

The data storage device 102 may operate in compliance with an industry specification. For example, the data storage device 102 may include a SSD and may be configured to communicate with the access device 170 using a small computer system interface (SCSI)-type protocol, such as a serial attached SCSI (SAS) protocol. As other examples, the data storage device 102 may be configured to communicate with the access device 170 using a NVM Express (NVMe) protocol or a serial advanced technology attachment (SATA) protocol. In other examples, the data storage device 102 may operate in compliance with a JEDEC eMMC specification, a JEDEC Universal Flash Storage (UFS) specification, one or more other specifications, or a combination thereof, and may be configured to communicate using one or more protocols, such as an eMMC protocol, a universal flash storage (UFS) protocol, a universal serial bus (USB) protocol, and/or another protocol, as illustrative, non-limiting examples.

The memory device 103 of the data storage device 102 includes a memory 104, such as a non-volatile memory of storage elements included in a memory die. For example, the memory 104 may include a flash memory, such as a NAND flash memory, or a resistive memory, such as a resistive random access memory (ReRAM), as illustrative, non-limiting examples. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 may include one or more blocks of storage elements (e.g., also referred to herein as memory cells). For example, each of the blocks may include a NAND flash erase block. Each storage element of the memory 104 may be programmable to a state (e.g., a threshold voltage in a flash configuration or a resistive state in a resistive memory configuration) that indicates one or more values. Each block of the memory 104 may include one or more word lines. Each word line may include one or more pages, such as one or more physical pages. A word line may be configurable to operate as a single-level-cell (SLC) word line, as a multi-level-cell (MLC) word line, or as a tri-level-cell (TLC) word line, as illustrative, non-limiting examples.

The memory device 103 includes support circuitry, such as read/write (R/W) circuitry 110, to support operation of the memory device 103, such as operation of one or more memory dies of the memory device 103. The read/write circuitry 110 may be a single component or may be divided into separate components of the memory device 103, such as read circuitry and write circuitry. The read/write circuitry 110 may be external to the one or more memory dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies.

The memory device 103 may be coupled via a second communication path 172, such as a bus, to the controller 120. For example, the second communication path 172 may include one or more channels to enable the controller 120 to communicate with a single memory die (e.g., the memory 104) of the memory device 103. As another example, the second communication path 172 may include multiple distinct channels (e.g., multiple communication channels) to enable the controller 120 to communicate with each memory die of the memory device 103 in parallel with, and independently of, communication with other memory dies of the memory device 103. The second communication path 172 may include a wired connection (e.g., a bus), a wireless connection, one or more interfaces, or a combination thereof.

The controller 120 includes an interface 160, a connector 152 and a data log generator 156. The controller 120 may be coupled to the access device 170 via the interface 160. The controller 120 is configured to receive data, such as the data 162, and instructions from the access device 170 and to send data to the access device 170. For example, the controller 120 may receive the data 162 from the access device 170 via the first communication path 174, and the controller 120 may send the data 162 to the access device 170 via the first communication path 174.

The controller 120 is configured to send data and commands to the memory device 103 and to receive data from the memory device 103. For example, the controller 120 is configured to send data and a write command to cause the memory device 103 to store data to a storage element (corresponding to an address) of the memory device 103. The write command may specify a physical address of a portion of the memory device 103 (e.g., a physical address of a word line of the memory device 103) that is to store the data. The controller 120 may also be configured to send data and commands to the memory device 103 associated with background scanning operations, garbage collection operations, and/or wear leveling operations, etc., as illustrative, non-limiting examples. The controller 120 is configured to send a read command to the memory device 103 to access data from a storage element (corresponding to a specified address) of the memory device 103. The read command may specify the physical address of a portion of the memory device 103 (e.g., a physical address of a word line of the memory device 103).

The data log generator 156 may be configured to generate log data 158 associated with operation of the data storage device 102. For example, the log data 158 may include parameter values, status information that represents an operational status of the data storage device 102, error messages, or a combination thereof, as illustrative, non-limiting examples. For example, the log data 158 may include one or more register values, a device temperature, a data rate, a number of program/erase operations, an amount of data stored at the memory 104, and/or an operational time of the data storage device 102, as illustrative, non-limiting example. In some implementations, the log data 158 may include or correspond to an error log that includes status information of the data storage device 102 at a time of failure. Additionally or alternatively, the data log generator 156 may be configured to generate the log data 158 according to a format (and/or protocol) associated with the connector 152. Accordingly, the log data 158 generated by the data log generator 156 may be communicated via the connector 152 as described further herein.

The connector 152 may be configured to be couple the data storage device 102 to another device, such as the data logger device 180. The connector 152 may enable data, such as the log data 158, to be communicated between the data logger device 180 and the data storage device 102. In some implementations, the connector 152 may enable power to be supplied from the data storage device 102 to power the data logger device 180. In some implementations, power may be supplied from the access device 170 to the data logger device 180 via the data storage device 102 (e.g., the connector 152). The connector 152 may include a universal asynchronous receiver/transmitter (UART) connector, a joint test action group (JTAG) connector, or a universal serial bus (USB) connector, as illustrative, non-limiting examples. In some implementations, the connector 152 may include a test port that is distinct from the interface 160

The data logger device 180 includes a connector 154, a memory 182, a controller 184, and a wireless interface 188. The memory 182 may be configured to store data, such as the log data 158. The memory 182 may include a secure digital (SD) memory, as an illustrative, non-limiting example. An illustrative example of the data logger device 180 is described further herein with reference to FIG. 2.

The connector 154 may be configured to be coupled to the data storage device 102. For example, the connector 154 of the data logger device 180 may be configured to be coupled to the connector 152 of the data storage device 102. The connectors 152, 154 may be directly coupled together or may be coupled via an intermediate connection, such as a bus or other wired connection. The connector 154 may enable data to be communicated between the data logger device 180 and the data storage device 102 via a connection (e.g., a third communication path 176). The third communication path 176 may include one or more channels to enable the memory controller 120 of the data storage device 102 to communication with the controller 184 of the data logger device 180. In some implementations, the connector 154 may enable power to be supplied from the data storage device 102 to the data logger device 180. The connector 154 may include a universal asynchronous receiver/transmitter (UART) connector, a joint test action group (JTAG) connector, or a universal serial bus (USB) connector, as illustrative, non-limiting examples.

The wireless interface 188 may be coupled to the controller 184. The wireless interface 188 may be configured wirelessly communicate data between the data logger device 180 and another device, such as the remote device 190. For example, the wireless interface 188 may include a wireless transceiver that is configured to transmit data, such as a packet 194 that includes the log data 158, to the remote device 190. As another example, the wireless interface 188 may be configured to receive control data 192 from remote device 190. In some implementations, the wireless interface 188 may include a Bluetooth® interface (Bluetooth® is a registered trademark of Bluetooth SIG, Inc.), a Zigbee® interface (Zigbee® is a registered trademark of the ZigBee Alliance), or a near field communication (NFC) interface, as illustrative, non-limiting examples.

The controller 184 may be coupled to the connector 154, the memory 182, and the wireless interface 188. The controller 184, such as a microcontroller, may be configured to receive the log data 158 from the data storage device 102. In some implementations, the controller 184 may receive the log data 158 while powered via the connector 154. The controller 184 may initiate transmission of the log data 158 to the remote device 190 via the wireless interface 188. Additionally or alternatively, the controller 184 may store the log data 158 in the memory 182. In some implementations, the controller 184 may send data to and receive data from the memory 182 using a serial peripheral interface (SPI) protocol.

The controller 184 may be configured to set a mode 186, such as an operating mode, of the data logger device 180. For example, the controller 184 may set the mode 186 based on the control data 192. In a first mode of multiple modes that may be supported by the data logger device 180, the controller 184 may store the log data 158 in the memory 182 of the data logger device 180 without initiating transmission of the log data 158 from the data logger device 180 to the remote device 190. In a second mode of the multiple modes, the controller 184 may access the log data 158 from the memory 182 and may initiate transmission of the log data 158 from the data logger device 180 to the remote device

190. In a third mode of the multiple modes, the controller 184 may store the log data 158 (or a copy thereof) in the memory 182 and may initiate transmission of the log data 158 from the data logger device 180 to the remote device 190.

In some implementations, the data logger device 180 may optionally include a power source, such as a battery 189. The battery 189 may be coupled to the controller 184. In some implementations, the battery 189 (or other power source) may be configured to be charged via a power supply received via the connector 154.

The remote device 190 (e.g., a host device) may be configured to wirelessly communicate with the data logger device 180. For example, the remote device 190 may be configured to send data, such as control data 192, to the data logger device 180. In some implementations, the control data 192 may indicate an operating mode for the data logger device 180. As another example, the remote device 190 may be configured to receive one or more packets, such as a representative packet 194, from the data logger device 180. The packet(s) 194 may include the log data 158 from the data storage device 102. The remote device 190 may process the log data 158 to validate (e.g., qualify) the data storage device 102 for use and/or to determine a cause of a failure of the data storage device 102. To illustrate, the remote device 190 may include a processor and a memory (not shown). The memory of the remote device 190 may include instructions that are executable by the processor to cause the remote device 190 to process the log data 158.

During operation, the data logger device 180 may be coupled to the data storage device 102 via the connectors 152, 154. The data storage device 102 may also be coupled to the access device 170 via the interface 160. The data storage device 102 may generate the log data 158 while coupled to the access device 170.

The data logger device 180 may receive, via the connector 154 of the data logger device 180, the log data 158 from the data storage device 102. In some implementations, the data logger device 180 may receive the log data 158 while the data logger device 180 is powered by the data storage device 102. In other implementations, the data logger device 180 may receive the log data 158 while the data logger device 180 powered by the battery 189. The data logger device 180 may store the log data 158 in the memory 182 of the data logger device 180.

The data logger device 180 may receive a request for the log data 158 from the remote device 190 via the wireless interface 188. In response to the request, the data logger device 180 may transmit the log data 158 to the remote device 190 via the wireless interface 188. In some implementations, the data logger device 180 may transmit the log data 158 to the remote device 190 while the data logger device 180 is coupled to the data storage device 102 via the connector 154. In other implementations, the data logger device 180 may transmit the log data 158 to the remote device 190 while the data logger device 188 is decoupled from the data storage device 102.

In some implementations, prior to transmitting the log data 158 to the remote device 190, the data logger device 180 may authenticate the remote device 190 for communication. For example, the data logger device 180 may receive a request from the remote device 190 for authentication. In response to the request, the data logger device 180 and the remote device 190 may perform an authentication procedure, such as a secure handshake, to enable secure peer-to-peer wireless communication between the remote device 190 and the data logger device 180. After the data logger device 180 authenticates the remote device 190, the remote device 190 may control operation of the data logger device 180 by sending the control data 192 to the data logger device 180.

Based on the control data 192, the data logger device 180 (e.g., the controller 184) may be configured to receive the log data 158 from the data storage device 102 via the connector 154, to initiate transmission of the log data 158 to the remote device 190 via the wireless interface 188, or both. Additionally or alternatively, the data logger device 180 (e.g., the controller 184) may store the log data 158 in the memory 182 based on the control data 192. To illustrate, the control data 192 may indicate one of multiple operating modes of the data logger device 180. In response to receiving the control data 192, the controller 184 may set the mode 186 of the data logger device 180. For example, the controller 184 may set the mode 186 to one of the first mode, the second mode, or the third mode. In some implementations, the data logger device 180 may be configured to have a default mode. For example, the first mode may be the default mode of the data logger device 180. As another example, the default mode may be a fourth mode in which the data logger device 180 does not receive the log data 158 from the data storage device 102 and does not send the log data 158 to the remote device 190.

In some implementations, the controller 120 may include or may be coupled to a particular memory (not shown), such as a non-volatile memory, a random access memory (RAM), or a read only memory (ROM), that is distinct from the memory device 103. The particular memory may be configured to store the log data 158. Additionally or alternatively, the log data 158 may be stored in a portion of the memory 104. The particular memory may be a single memory component, multiple distinct memory components, and/or may include multiple different types (e.g., volatile memory and/or non-volatile) of memory components. The particular memory may be accessible to the data log generator 156.

In some implementations, the data storage device 102 may be embedded within the access device 170, such as in accordance with a Joint Electron Devices Engineering Council (JEDEC) Solid State Technology Association Universal Flash Storage (UFS) configuration. For example, the data storage device 102 may be configured to be coupled to the access device 170 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 102 may be removable from the access device 170 (i.e., "removably" coupled to the access device 170). As an example, the data storage device 102 may be removably coupled to the access device 170 in accordance with a removable universal serial bus (USB) configuration.

In some implementations, the data storage device 102 may include or correspond to a solid state drive (SSD) which may be included in, or distinct from (and accessible to), the access device 170. For example, the data storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 102 is coupled to the access device 170 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the data storage device 102 may be a network-attached storage (NAS) device or a component (e.g., a solid-state drive (SSD) device) of a data center storage system, an enterprise storage system, or a storage area network.

The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. In some implementations, the data storage device 102 and the access device 170 may be configured to communicate using one or more protocols, such as an eMMC protocol, a universal flash storage (UFS) protocol, a universal serial bus (USB) protocol, a serial advanced technology attachment (SATA) protocol, and/or another protocol, as illustrative, non-limiting examples. Additionally or alternatively, the data storage device 102 and the data logger device 180 may be configured to communicate (e.g., via the connectors 152, 154) using one or more protocols, such as a USB protocol, a UART protocol, joint test action group (JTAG), a peripheral component interconnect express (PCIe) protocol, a SAS protocol, a SATA protocol, a NVMe protocol, an advance d host controller interface (AHCI) protocol, and/or another protocol, as illustrative, non-limiting examples.

The data logger device 180 enables the log data 158 to be provided (e.g., wirelessly communicated) to the remote device 190. For example, the log data 158 may be provided in real-time or near real-time from the data storage device 102 to the remote device 190 via the data logger device 180. Thus, the remote device 190 may receive the log data 158 without having to be coupled directly to the data storage device 102. Accordingly, the data logger device 180 may reduce physical effort, reduce costs, and shorten an amount of time to provide the log data 158 from the data storage device 102 to the remote device 190.

Figure 2:
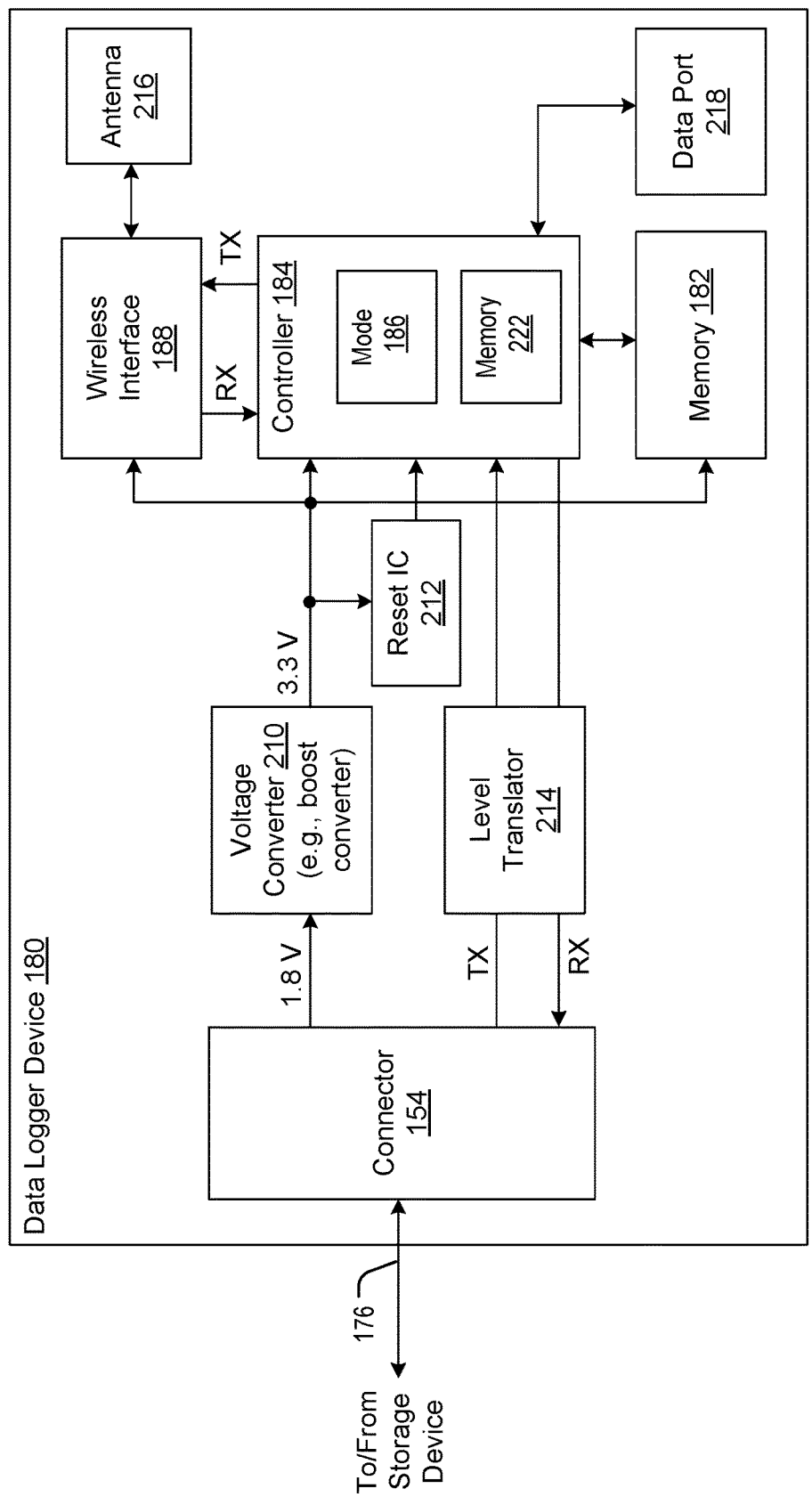
FIG. 2 is a block diagram of a particular illustrative example of components that may be included in the data logger device of FIG. 1.

Referring to FIG. 2, an illustrative example of components that may be included in the data logger device 180 is depicted and designated 200. As illustrated in FIG. 2, the data logger device 180 includes the connector 154, the controller 184, the memory 182, and the wireless interface 188. The data logger device 180 further includes a voltage converter 210, a level translator 214, a reset integrated circuit (IC) 212, an antenna 216, and a data port 218. The antenna 216 is coupled to the wireless interface 188 and is configured to transmit and receive data, such as the control data 192 or the packet 194 of FIG. 1.

The voltage converter 210, such as a boost converter, is configured to receive a power supply from the data storage device 102 via the connector 154. The voltage converter 210 may change a voltage of the power supply from a first value (e.g., 1.8 volts) to a second value (e.g., 3.3 volts). The voltage converter 210 may output the second voltage value to one or more components of the data logger device 180.

The reset IC 212 may be coupled to the voltage converter 210 and to the controller 184. The reset IC 212 may be configured to provide a reset signal to the controller 184 to cause the controller 184 to set the mode 186 to a default mode. For example, the reset IC 212 may send the reset signal to the controller 184 in response to receiving the second voltage from the voltage converter 210.

The level translator 214 may be coupled to the connector 154 and to the controller 184. The level translator 214 may operate as an interface between components that operate at different voltage levels. For example, the level translator 214 may adjust a data level (e.g., data signals) exchanged between the data logger device 180 (e.g., the controller 184) and the data storage device 102 (e.g., the controller 120).

The controller 184 may include the mode 186 and a memory 222. The memory 222 may include a non-volatile memory, a random access memory (RAM), or a read only memory (ROM), that is distinct from the memory 182. In some implementations, the memory 222 may include firmware that is executable by the controller 184. The firmware may be provided to (e.g., stored in) the memory 222 via the data port 218.

Although FIG. 2 illustrates the data logger device 180 as including a particular set of components, in other implementations, the data logger device 180 may include fewer components or additional components. For example, in another implementation of the data logger device 180, the data logger device 180 may not include the reset IC 212 or the data port 218.

Figure 3:
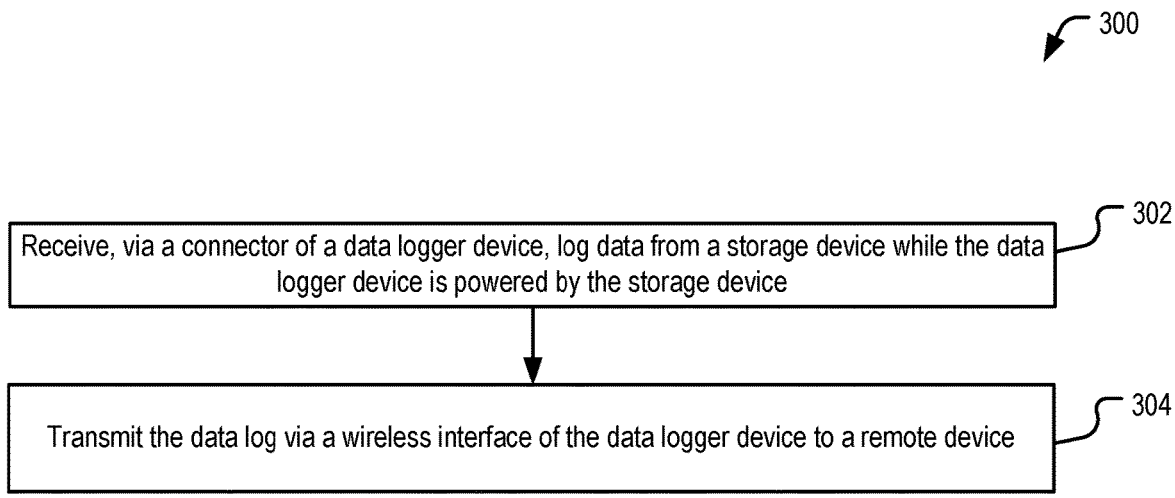
FIG. 3 is a flowchart of a particular illustrative example of a method of operating the data logger device of FIG. 1.

Referring to FIG. 3, a particular illustrative example of a method of operating a data logger device is depicted and generally designated 300. The method 300 may be performed at the data logger device 180 of FIG. 1. To illustrate, the method 300 may be performed by the controller 184, the wireless interface 188, or a combination thereof.

The method 300 includes receiving, via a connector of a data logger device, log data from a storage device while the data logger device is powered by the storage device, at 302. For example, the connector may include the connector 154 of FIG. 1. The storage device may include or correspond to the data storage device 102 of FIG. 1. The log data, such as the log data 158, may be generated by the storage device during operation of the storage device while the storage device is coupled to an access device, such as the access device 170 of FIG. 1.

The method 300 further includes transmitting the log data via a wireless interface of the data logger device to a remote device, at 304. The wireless interface may include or correspond to the wireless interface 188. The remote device may include or correspond to the remote device 190 of FIG. 1.

In some implementations, prior to transmitting the log data, the method 300 may include storing the log data in a memory of the data logger device. For example, the memory may include or correspond to the memory 182 of FIG. 1. Additionally or alternatively, the method 300 may include receiving a request for the log data from the remote device. The data logger device may transmit the log data to the remote device responsive to the request.

In some implementations, the data logger device may receive a request from the remote device for authentication. Responsive to the request for authentication, the data logger device may authenticate the remote device to enable secure peer-to-peer wireless communication between the remote device and the data logger device. After the remote device is authenticated, the remote device may send control data, such as the control data 192, to the data logger device and may receive the log data from the data logger device.

In some implementations, upon the connector of the data logger device being coupled to the storage device, the data logger device may receive power from the storage device. In response to receiving the power, the controller may be powered on and may operate according the set mode of multiple modes of operation. In some implementations, in response to receiving the power from the storage device, the mode of operation may be set to a default mode, such as one of the multiple modes of operation. The multiple modes of operation may include a first mode, a second mode, and a third mode, as illustrative, non-limiting examples. If the mode of operation of the data logger device is the first mode, the controller of the data logger device may be configured to receive the log data from the storage device and to store the log data in the memory of the data logger device. In the first mode, the controller may be configured to receive and store the log data without initiating transmission of the log data to the remote device. If the mode of operation is the second mode, the controller may be configured to access the log data from the memory and to transmit the log data to the remote device. If the mode of operation is the third mode, the controller may be configured to receive the log data from the storage device, to store the log data in the memory of the data logger device, and to initiate transmission of the log data to the remote device.

The method 300 may enable log data to be provided (e.g., wirelessly communicated) to the remote device. For example, the log data may be provided in real-time or near real-time from the data storage device to the remote device via the data logger device. Thus, the remote device may receive the log data without having to be coupled directly to the data storage device.

Figure 4:
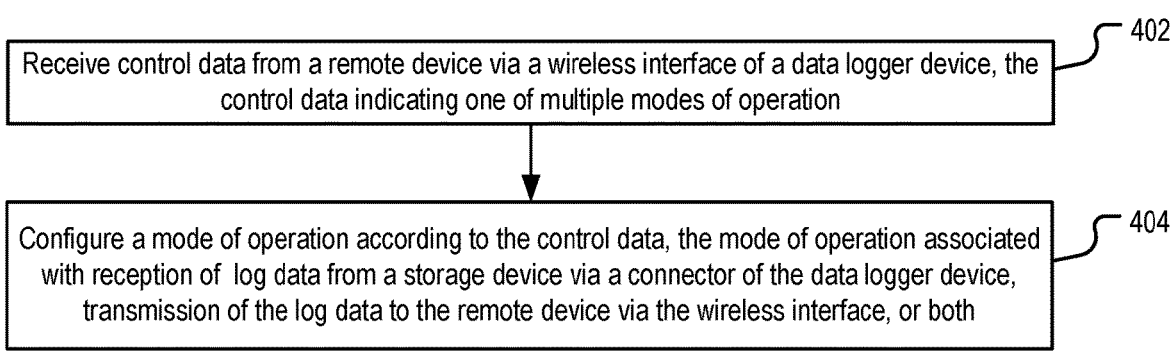
FIG. 4 is a flowchart of a particular illustrative example of another method of operating the data logger device of FIG. 1.

Referring to FIG. 4, a particular illustrative example of another method of operating a data logger device is depicted and generally designated 400. The method 400 may be performed at the data logger device 180 of FIG. 1. To illustrate, the method 400 may be performed by the controller 184, the wireless interface 188, or a combination thereof.

The method 400 includes receiving control data from a remote device via a wireless interface of a data logger device, the control data indicating one of multiple modes of operation, at 402. The control data may include or correspond to the control data 192 received from the remote device 190 of FIG. 1. The wireless interface may include or correspond to the wireless interface 188 of the data logger device 180 of FIG. 1. The method 400 further includes configuring a mode of operation according to the control data, the mode of operation associated with reception of log data from a storage device via a connector of the data logger device, transmission of the log data to the remote device via the wireless interface, or both, at 404. Referring to FIG. 1, the controller 184 may configure the data logger device 180 by setting the mode 186 of the data logger device 180 based on the control data 192.

The method 300 of FIG. 3 and/or the method 400 of FIG. 4 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 300 of FIG. 4 and/or the method 400 of FIG. 4 can be initiated or controlled by one or more processors, such as one or more processors included in or coupled to a controller or a memory of the data storage device 102, the access device 170, the data logger device 180, and/or the remote device 190 of FIG. 1. A controller configured to perform the method 300 of FIG. 3 and/or the method 400 of FIG. 4 may be configured to receive log data from a data storage device and/or to provide the log data to a remote device 190. As an example, one or more of the methods of FIGS. 3-4, individually or in combination, may be performed by the controller 184 of FIG. 1. To illustrate, a portion of one of the methods FIGS. 3-4 may be combined with a second portion of one of the methods of FIGS. 3-4. Additionally, one or more operations described with reference to the FIGS. 3-4 may be optional, may be performed at least partially concurrently, and/or may be performed in a different order than shown or described.

Although various components of the data storage device 102, such as the controller 120 (e.g., the data log generator 156) of FIG. 1, and/or various components of the data logger device 180, such as the controller 184 or the wireless interface 188, of FIGS. 1 and 2 are depicted herein as block components and described in general terms, such components may include one or more physical components, such as hardware controllers, one or more microprocessors, state machines, logic circuits, one or more other structures, other circuits, or a combination thereof configured to enable the various components to perform operations described herein.

Components described herein may be operationally coupled to one another using one or more nodes, one or more buses (e.g., data buses and/or control buses), one or more other structures, or a combination thereof. One or more aspects of the various components may be implemented using a microprocessor or microcontroller programmed to perform operations described herein, such as one or more operations of the method 300 of FIG. 3 and/or the method 400 of FIG. 4.

Alternatively or in addition, one or more aspects of the data storage device 102, such as the controller 120 (e.g., the data log generator 156) of FIG. 1, and/or one or more aspects of the data logger device 180, such as the controller 184 or the wireless interface 188, of FIGS. 1 and 2 may be implemented using a microprocessor or microcontroller programmed (e.g., by executing instructions) to perform operations described herein, such as one or more operations of the method 300 of FIG. 3 and/or the method 400 of FIG. 4, as described further herein. As an illustrative, non-limiting example, the data storage device 102 includes a processor executing instructions (e.g., firmware) retrieved from the memory device 103. Alternatively or in addition, instructions that are executed by the processor may be retrieved from a separate memory location that is not part of the memory device 103, such as at a read-only memory (ROM) of the data storage device 102 or the access device 170 of FIG. 1.

In some implementations, each of the controller 120, the memory device 103, the access device 170, the data logger device 180, and/or the remote device 190 of FIG. 1 may include a processor executing instructions that are stored at a memory, such as a non-volatile memory of the data storage device 102, the access device 170, the data logger device 180, and/or the remote device 190 of FIG. 1. Alternatively or additionally, executable instructions that are executed by the processor may be stored at a separate memory location that is not part of the non-volatile memory, such as at a read-only memory (ROM) of the data storage device 102, the access device 170, the data logger device 180, and/or the remote device 190 of FIG. 1.

With reference to FIG. 1, the data storage device 102 may be attached to or embedded within one or more accessing devices, such as within a housing of the access device 170. For example, the data storage device 102 may be embedded within the access device 170 in accordance with a Joint Electron Devices Engineering Council (JEDEC) Solid State Technology Association Universal Flash Storage (UFS) configuration. To further illustrate, the data storage device 102 may be integrated within an apparatus, such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory. However, in other implementations, the data storage device 102 may be implemented in a portable device configured to be selectively coupled to one or more external accessing devices. For example, the data storage device 102 may be removable from the access device 170 (i.e., "removably" coupled to the access device 170). As an example, the data storage device 102 may be removably coupled to the access device 170 in accordance with a removable universal serial bus (USB) configuration. In still other implementations, the data storage device 102 may be a component (e.g., a solid-state drive (SSD)) of a network accessible data storage system, such as an enterprise data system, a network-attached storage system, a cloud data storage system, etc. Additionally or alternatively, the data logger device 180 may be embedded within the data storage device 102 or may be removably coupled to the data storage device 102.

The memory device 103 (e.g., the memory 104), the memory 182, or the memory 222 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory device 103 (e.g., the memory 104), the memory 182, or the memory 222 may include another type of memory. In some implementations, one or more of the memory device 103 (e.g., the memory 104), the memory 182, or the memory 222 may include a semiconductor memory device.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the examples described herein are intended to provide a general understanding of the various aspects of the disclosure. Other implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   a connector configured to be coupled to a corresponding connector of a storage device, the storage device having an interface for connection to an access device;
   a wireless interface configured to receive control data from a remote device, the control data indicating a mode of operation; and
   a controller coupled to the connector and the wireless interface, the controller powered via the connector, the controller configured to:
      receive log data from the storage device via the connector while powered via the connector and store the log data in response to the control data indicating a first mode of operation, the log data comprises status information of the storage device at a time of failure of the storage device, and
      transmit the log data via the wireless interface to the remote device in response to the control data indicating a second mode of operation.

2. The device of claim 1, wherein the controller is further configured to transmit the log data via the wireless interface while powered via the connector.

3. The device of claim 1, wherein the connector comprises a universal asynchronous receiver/transmitter (UART) connector, a joint test action group (JTAG) connector, or a universal serial bus (USB) connector.

4. The device of claim 1, further comprising a memory configured to store the log data.

5. The device of claim 4, wherein the memory comprises a secure digital (SD) memory.

6. The device of claim 1, wherein the wireless interface is a Bluetooth interface, a Zigbee interface, or a near field communication interface.

7. The device of claim 1, wherein the wireless interface comprises a Bluetooth interface, a Zigbee interface, or a near field communication (NFC) interface.

8. The device of claim 1, further comprising:
   a data logger device including the connector, the controller, and the wireless interface;
   wherein the storage device is coupled to the data logger device, the storage device comprising:
      a second connector configured to be coupled to the connector of the data logger device,
      an interface configured to be coupled to an access device,
      a non-volatile memory configured to store data received from the access device via the interface, and
      a memory controller coupled to the non-volatile memory, the memory controller configured to generate the log data, wherein the log data comprises an error log associated with the storage device, the error log including status information of the storage device at a time of failure of the storage device.

9. The device of claim 8, wherein:
   the storage device further comprises a solid state drive, and
   the data logger device is embedded within the storage device.

10. A device comprising:
    a connector configured to be coupled to a corresponding connector of a storage device, the storage device having an interface for connection to an access device;
    a wireless interface configured to receive control data from a remote device, the control data indicating one of multiple modes of operation; and a controller coupled to the connector and to the wireless interface, the controller configured to set a mode of operation according to the control data, the mode of operation associated with reception of a power supply and log data from the storage device via the connector, transmission of the log data to the remote device via the wireless interface, or both, the log data includes an error log that includes status information of the storage device at a time of failure of the storage device, the log data transmitted to the remote device via the wireless interface while the access device is coupled through the interface.

11. The device of claim 10, further comprising a battery coupled to the controller.

12. The device of claim 10, further comprising a memory configured to store the log data, wherein, if the mode of operation is a first mode, the controller is further configured to receive the log data from the storage device and to store the log data in the memory.

13. The device of claim 12, wherein, if the mode of operation is a second mode, the controller is further configured to access the log data from the memory and to transmit the log data to the remote device.

14. The device of claim 10, further comprising a memory configured to store the log data, wherein, if the mode of operation is a third mode, the controller is further configured to receive the log data from the storage device, to store the log data in the memory, and to initiate transmission of the log data to the remote device.

15. A method comprising:
 receiving, via a connector of a data logger device, log data from a corresponding connector of a storage device while the data logger device is powered by the storage device via the connector and while the storage device is coupled to an access device through an interface, the log data comprises status information of the storage device at a time of failure of the storage device;
 receiving control data from a remote device, wherein the control data indicates an operating mode of the data logger device;
 in response to the control data indicating a first mode, storing the log data in a memory of the data logger device without transmitting the log data from the data logger device to the remote device;
 in response to the control data indicating a second mode;
 accessing the log data from the memory,
 transmitting the log data via a wireless interface of the data logger device to the remote device while the storage device is coupled to the access device through the interface, and
 performing failure analysis on the log data at the remote device to determine a cause of failure of the storage device.

16. The method of claim 15, further comprising:
 prior to transmitting the log data, storing the log data in a memory of the data logger device; and
 receiving a request for the log data from the remote device, wherein the log data is transmitted to the remote device responsive to the request.

17. The method of claim 15, further comprising:
 receiving a request from the remote device for authentication; and
 authenticating the remote device to enable secure peer-to-peer wireless communication between the remote device and the data logger device.

18. The method of claim 15, wherein the operating mode is one of three or more operating modes.

19. The method of claim 18, wherein the operating mode includes at least a third operating mode in which the log data is stored in a memory of the data logger device and is transmitted from the data logger device to the remote device, and a fourth operating mode in which the data logger device does not receive the log data from the storage device and does not send the log data to the remote device.

20. The method of claim 19, wherein the fourth operating mode is a default operating mode.

21. The method of claim 18, further comprising, if the operating mode is a third mode:
 storing the log data in a memory of the data logger device; and
 initiating transmission of the log data from the data logger device to the remote device.

22. The method of claim 15, further comprising, in response to a controller of the data logger device receiving power from the storage device via the connector:
 powering on the controller; and
 setting the operating mode to a default mode.

23. The method of claim 22, wherein the default mode comprises the first mode.

* * * * *